Patented July 22, 1924.

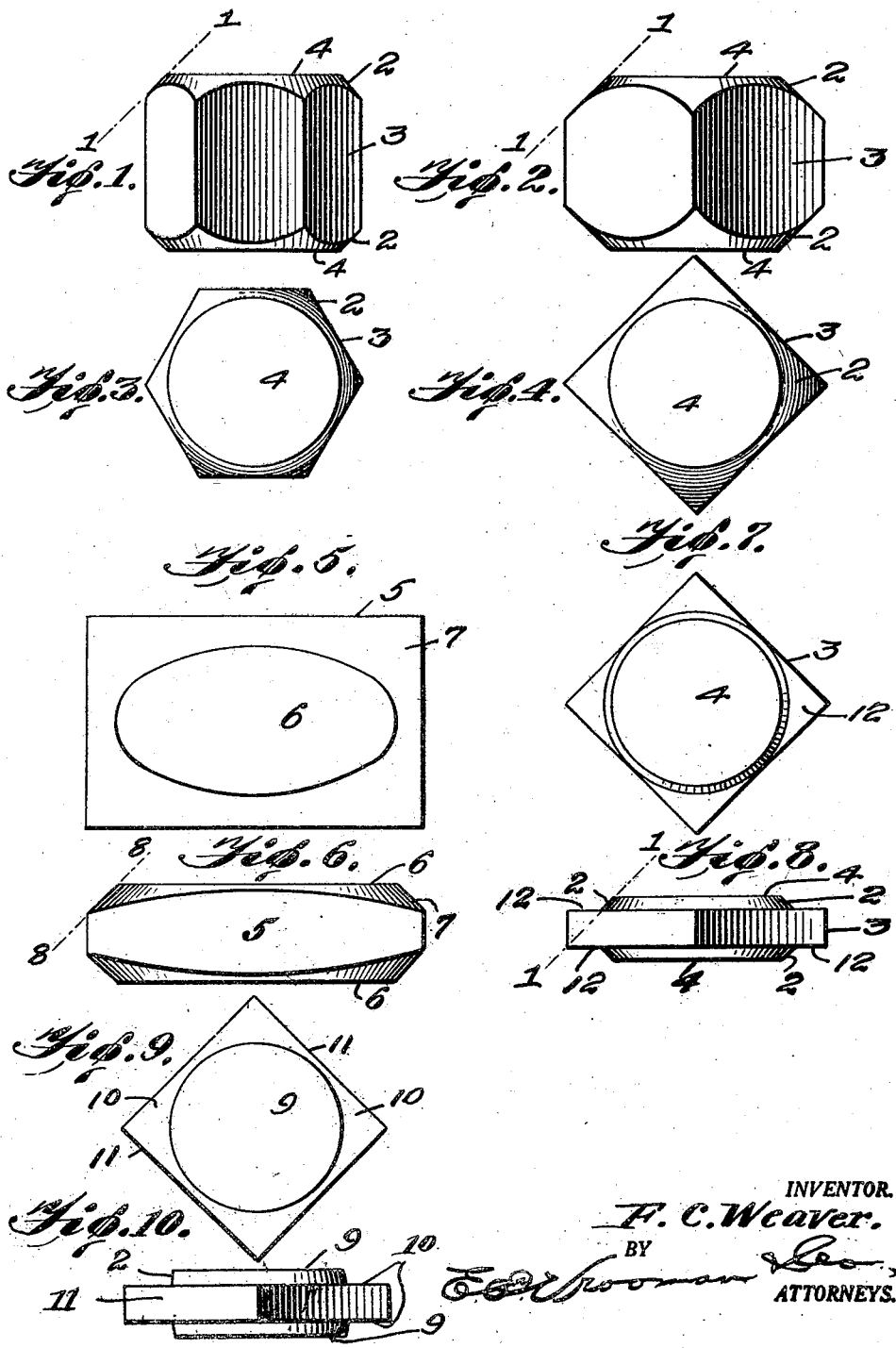

1,502,075

UNITED STATES PATENT OFFICE.

FLOYD C. WEAVER, OF WASHINGTON, DISTRICT OF COLUMBIA.

GAUGE-BLOCK FORM.

Application filed November 28, 1922. Serial No. 603,800.

*To all whom it may concern:*

Be it known that I, FLOYD C. WEAVER, a citizen of the United States, residing at Washington, District of Columbia, have invented certain new and useful Improvements in Gauge-Block Forms, of which the following is a specification, reference being had therein to the accompanying drawings.

This invention relates to a gauge block form, and the object of the invention is to provide a form of geometric cross section or other regular chosen section of a size block or gauge block with a pair of measuring surfaces of a defined outline permitting of said measuring surfaces to satisfy in all conditions of use the four requisites of a gauge block to the extreme accuracy of interference comparison, namely, (a) plane measuring surfaces, (b) parallel measuring surfaces, (c) the freedom of distortion of measuring surfaces by handling, cleaning, clamping, ringing, etc., (d) permanence of planeness and parallelism of measuring surfaces with a constant normal separating distance of said surfaces, i. e. "length of gauge".

Another object of this invention is to provide a practicable form of a size block or gauge block of the commercial sections of stock such that all effects of use or application in use will not involve the errors accumulating from the distortions of the measuring surfaces of the usual forms of such gauges when said gauges are used singly or when a number are rung or clamped together.

A still further object of this invention is to provide a form of gauge block such that the free edge of the measuring surfaces will be free to the effects of the temperature variations causing the distortions of the said measuring surfaces near the edges, etc., where the radiating surface per unit mass of the gauge block is greatest, or where the apparent heat conduction is increased.

Another object of this invention is to provide a form of gauge block such that a number of gauge blocks may be readily rung or clamped together such that the combining errors will be uniformly distributed at each pair of the rung measuring surfaces.

With these and other objects in view, my invention comprises certain novel combinations, constructions and arrangements of parts as will be hereinafter described, illustrated in the accompanying drawings, and more particularly pointed out in the appended claims.

In the drawings:

Figure 1 is a view in side elevation of one of the forms of my gauge block, while Figure 2 is another embodiment.

Figure 3 is a plan view of the embodiment shown in Fig 1, while

Figure 4 is a plan view of the block shown in Fig. 2.

Figure 5 is a plan view of another form of my block, while

Figure 6 is a view in side elevation of the same.

Figure 7 is a plan view of another embodiment of my invention, while

Figure 8 is a view in side elevation of the same.

Figure 9 is another embodiment of my invention, while

Figure 10 is a view in side elevation of the same.

Referring to the drawings by numerals, in Figs. 1 to 4 I have shown hexagon section blocks, made from a standard stock rolled section steel bar. Surfaces 3 are the non-measuring surfaces and may be the original stock surfaces. Surfaces 4 are the accurately lapped measuring surfaces made precisely plane and parallel at a given distance apart or separation (denoting the length of the gauge) by the lapping process. These two surfaces 4 are defined in outline to some geometric boundary line, as a circle, ellipse, rectangle, etc., by a beveled or chamfered surface 2 intersecting the non-measuring surfaces 3 and the measuring surfaces 4, at an approximate angle as is indicated by an element of such surface 2, i. e., line 1—1. Thus the two precision end measuring faces 4 are definitely defined and made free of the effects of change of temperature, the original hardening effects, etc., occurring at corners and edges. The number of sides 3 of the blocks may be increased up to any number, i. e., from such a number as three plane sides up to a cylindrical surface, either of revolution or otherwise.

Referring particularly to Figs. 2 and 4, I have shown a similar block to the block shown in Figs. 1 and 3, but the block shown in Fig. 2 has a square stock bar section or body with sides 3, as more particularly shown in the plan view, Fig. 4. The measuring faces 4 are again defined by beveled or chamfered surfaces 2, an element of which is indicated by line 1—1, Fig. 2.

In Figs. 7 and 8 a similar section block is shown to that illustrated in Figs. 2 and 4, which block is provided with measuring faces 4 defined by the beveled or chamfered surfaces 2, an element of which surface is indicated by line 1—1, Fig. 8, in making a given angle to the said measuring surfaces 4. These surfaces 2 are not continued to point of intersection with non measuring sides 3 for the thin or short gauges, but joins on to the plane surfaces 12 which in turn joins on the faces 3. These faces 12 may be at right angles to the faces 3 or at some angle other than 90 degrees. Surfaces 12 may be also some other than a plane surface as a section of a sphere.

Referring to Figs. 9 and 10: A form of block similar to the block in Figs. 7 and 8 is shown, wherein the measuring surfaces 9 are relieved and defined by surface 2 more abruptly than is shown in either Figs. 1 and 3, or 2 and 4, or 7 and 8; approaching very near to a short cylindrical section joined onto the center portion by surfaces 10. These surfaces 10 are defined as the surfaces 12 of the blocks shown in Figs. 7 and 8. The surfaces 11 are defined as the previously described surfaces 3 of the blocks shown in Figs. 7 and 8, 2 and 4, and 1 and 3.

In Figs. 5 and 6 I have shown a block of a rectangular cross section with measuring faces 6 defined as an ellipse by the chamfered surface 7 at an angle to said surfaces 6, as indicated by the line 8—8, Fig. 6. The sides 5 of the block very closely approximate the original sides of the stock material. Thin gauge blocks are made up in a similar way as the forms shown in Figs. 7, 8, 9 and 10.

This invention provides a form of gauge block having two precisely plane and parallel measuring surfaces separated by a convenient and desirable cross section body of material such as to insure to a degree of precision, as is attainable by interference of light methods of testing, as required in the four principal items: (a) measuring surfaces to remain precisely plane under temperature changes, etc., and other conditions incident to the use of the gauge blocks; (b) measuring faces to remain precisely parallel under temperature changes, etc., and other conditions incident to the use of the gauge blocks; (c) the measuring surfaces to remain at a given normal separation distance or length for a given temperature, even after having previously been held to a higher or lower temperature; (d) the measuring to remain at a given separation distance or length for a given temperature over the entire life period of the gauge block, i. e., free of changes of length as the block ages with time and use.

This invention provides a gauge block form admitting the measuring surfaces to be free from distortional changes brought about by the effect of corners and edges of intersecting faces.

This gauge block form admits of combining a number of gauges together to give a desired length without the errors arising from distortions of the measuring surfaces near the edges of the abrupt corners.

While I have described the preferred embodiments of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. A block of the class described comprising a body provided with non-measuring side surfaces and with accurately lapped upper and lower measuring surfaces, and bevelled faces intersecting the accurately lapped measuring surfaces, said bevelled surfaces extending continuously about said block and each forming a frustrum of a cone.

2. A block of the character described having side faces and opposed end faces, said end faces being flat and parallel to each other and constituting measuring surfaces, the edge portions of said block being reduced in thickness from the upper and lower ends to provide a reduced bordering portion and inclined surfaces connecting the upper and lower surfaces of the bordering portion with the measuring surfaces.

3. As a new article of manufacture a block of the class described comprising a body having opposed accurately lapped measuring surfaces, said body also provided with a pair of beveled surfaces intersecting said accurately lapped measuring surfaces at the edges thereof and each forming a frustrum of a cone, and said body provided between said bevelled surfaces with side extensions of less thickness than the body of the block and having non-measuring surfaces, substantially as shown and described.

4. A gauge block comprising a body formed of standard sectional material, said body provided with a pair of opposed plane and parallel measuring surfaces, said measuring surfaces denoted by any regular or geometric line formed by a chamfer or beveling or relieving such that all parts of said measuring surfaces are bound by an edge of a given degree of abruptness, or freedom from intersecting edges and corners.

5. A gauge block comprising a body of any standard, sectional material, said body provided with two opposed plane and parallel measuring surfaces, and said surfaces being bound by any desired limiting line and relieved from the remaining portion of the body by non-measuring surfaces or faces extending at an abrupt angle and each forming a frustrum of a cone, substantially as shown and described.

In testimony whereof I hereunto affix my signature.

FLOYD C. WEAVER.